United States Patent
Kretschmann

(10) Patent No.: US 8,264,209 B2
(45) Date of Patent: Sep. 11, 2012

(54) METHOD OF AND APPARATUS FOR OPERATING A DOUBLE-FED ASYNCHRONOUS MACHINE IN THE EVENT OF TRANSIENT MAINS VOLTAGE CHANGES

(75) Inventor: Jörg Kretschmann, Kempen (DE)

(73) Assignee: Woodward Kempen GmbH, Kempen (DE)

( * ) Notice: Subject to any disclaimer, the term of this patent is extended or adjusted under 35 U.S.C. 154(b) by 464 days.

(21) Appl. No.: 12/532,748

(22) PCT Filed: Mar. 17, 2008

(86) PCT No.: PCT/EP2008/053139
§ 371 (c)(1),
(2), (4) Date: Sep. 23, 2009

(87) PCT Pub. No.: WO2008/116769
PCT Pub. Date: Oct. 2, 2008

(65) Prior Publication Data
US 2010/0117605 A1 May 13, 2010

(30) Foreign Application Priority Data
Mar. 24, 2007 (DE) .......................... 10 2007 014 728

(51) Int. Cl.
*H02P 11/00* (2006.01)
*H02P 9/00* (2006.01)
*H02H 7/06* (2006.01)
*H02P 9/10* (2006.01)
*H02P 9/14* (2006.01)
(52) U.S. Cl. .............. 322/25; 322/24; 322/59; 318/808; 290/40 C; 290/44; 320/166
(58) Field of Classification Search .................. 322/24, 322/25, 59; 320/166; 318/808; 290/40 C, 290/44
See application file for complete search history.

(56) References Cited

U.S. PATENT DOCUMENTS
3,975,646 A * 8/1976 Kilgore et al. .................. 307/21
(Continued)

FOREIGN PATENT DOCUMENTS
WO WO 2004/030199 A2 4/2004
(Continued)

OTHER PUBLICATIONS
Seman et al.: "Ride-Through Analysis of Doubly Fed Induction Wind-Power Generator Under Unsymmetrical Network Disturbance", in: IEEE Transactions on Power Systems, vol. 21, No. 4, Nov. 1, 2006.
(Continued)

*Primary Examiner* — Pedro J Cuevas
(74) *Attorney, Agent, or Firm* — Henry M. Feiereisen, LLC

(57) ABSTRACT

The invention relates to a method and a device for operating an asynchronous motor (1) with double feeds, having a stator (1a) connected to a grid and a rotor (1b) connected to an inverter (6), said inverter (6) being designed such that it impresses a target value for an electrical variable in the rotor (1b). In a method according to the invention, after detecting a transient grid voltage change, a target value for the electrical variable determined from at least the rotor flux and the stator flux is impressed in the rotor (1b) such that an active reduction in the torque occurring during the transient grid voltage change is achieved. The target value of the electrical variable is preferably determined from a suitable weighting of the stator flux, rotor flux, stator voltage, stator current, rotor current, and, if available as a measured variable, stator voltage.; In this manner, torque peaks are similarly prevented for various types of grid faults, and the maximum time value of the rotor current is optimally reduced, and a rapid return to regular operation of the asynchronous motor is made possible.

29 Claims, 10 Drawing Sheets

U.S. PATENT DOCUMENTS

| | | | |
|---|---|---|---|
| 4,565,957 A * | 1/1986 | Gary et al. | 318/723 |
| 4,973,174 A * | 11/1990 | Losic et al. | 388/811 |
| 4,973,896 A * | 11/1990 | Shiga et al. | 322/28 |
| 4,980,620 A * | 12/1990 | Losic et al. | 318/268 |
| 4,982,147 A * | 1/1991 | Lauw | 318/729 |
| 4,994,684 A * | 2/1991 | Lauw et al. | 290/52 |
| 5,028,804 A * | 7/1991 | Lauw | 290/40 C |
| 5,083,077 A * | 1/1992 | Wallace et al. | 322/32 |
| 5,272,429 A * | 12/1993 | Lipo et al. | 318/808 |
| 5,333,105 A * | 7/1994 | Fortune | 363/56.11 |
| 5,334,923 A * | 8/1994 | Lorenz et al. | 318/805 |
| 6,198,248 B1 * | 3/2001 | Thomas et al. | 318/800 |
| 6,636,012 B2 * | 10/2003 | Royak et al. | 318/727 |
| 7,176,658 B2 * | 2/2007 | Quazi et al. | 322/24 |
| 7,372,174 B2 * | 5/2008 | Jones et al. | 290/44 |
| 7,511,385 B2 * | 3/2009 | Jones et al. | 290/43 |
| 7,570,027 B2 * | 8/2009 | Teramoto et al. | 322/24 |
| 7,592,785 B2 * | 9/2009 | Kimura et al. | 322/59 |
| 7,605,487 B2 * | 10/2009 | Barton et al. | 290/44 |
| 7,622,815 B2 * | 11/2009 | Rivas et al. | 290/44 |
| 7,656,052 B2 * | 2/2010 | Jones et al. | 290/43 |
| 7,692,321 B2 * | 4/2010 | Jones et al. | 290/43 |
| 7,755,209 B2 * | 7/2010 | Jones et al. | 290/44 |
| 7,989,974 B2 * | 8/2011 | Fortmann et al. | 290/44 |
| 8,030,791 B2 * | 10/2011 | Lang et al. | 290/44 |
| 8,053,917 B2 * | 11/2011 | Wakasa et al. | 290/44 |
| 8,084,892 B2 * | 12/2011 | Yasugi | 307/129 |
| 8,125,178 B2 * | 2/2012 | Hammel et al. | 318/802 |
| 8,125,193 B2 * | 2/2012 | Page et al. | 320/136 |
| 8,125,195 B2 * | 2/2012 | Kouwa | 322/28 |
| 8,129,957 B2 * | 3/2012 | Martin | 322/44 |
| 8,134,345 B2 * | 3/2012 | Bray et al. | 322/59 |
| 8,138,729 B2 * | 3/2012 | Konishi | 322/28 |
| 8,164,312 B1 * | 4/2012 | Eitzmann | 322/37 |
| 8,164,313 B2 * | 4/2012 | Maehara | 322/59 |
| 8,169,197 B2 * | 5/2012 | Rittiger | 322/24 |
| 2002/0101221 A1 * | 8/2002 | Stefanovic et al. | 322/24 |
| 2005/0013085 A1 * | 1/2005 | Kinsella et al. | 361/162 |
| 2005/0116476 A1 | 6/2005 | Feddersen | 290/44 |
| 2006/0238929 A1 | 10/2006 | Nielsen | 361/20 |
| 2007/0052244 A1 | 3/2007 | Hudson | 290/44 |
| 2007/0080007 A1 * | 4/2007 | Teramoto et al. | 180/65.3 |
| 2008/0157529 A1 * | 7/2008 | Rivas et al. | 290/44 |
| 2009/0146426 A1 * | 6/2009 | Jones et al. | 290/44 |
| 2009/0146500 A1 * | 6/2009 | Jones et al. | 307/82 |
| 2010/0327798 A1 * | 12/2010 | Stichweh | 318/729 |
| 2012/0043994 A1 * | 2/2012 | Alvarez Valenzuela et al. | 327/82 |
| 2012/0049629 A1 * | 3/2012 | Miller et al. | 307/64 |

FOREIGN PATENT DOCUMENTS

WO   WO 2006/030183 A1   3/2006

OTHER PUBLICATIONS

Xiang et al.: "Control of a doubly fed induction generator in a wind turbine during grid fault ride-through", in: Database Compendex Engineering Information [online], NY, NY, Sep. 3, 2006.

Causebrook et al.: "Fault ride-through shifting the balance of power from blade pitch to electrical resistance", in: Athens, EWEC, Feb. 2006.

Marvik et al.: "Control of a wind turbine with a doubly fed induction generator after transient failures", in: NOEPIE, Feb. 2004.

* cited by examiner

METHOD OF AND APPARATUS FOR OPERATING A DOUBLE-FED ASYNCHRONOUS MACHINE IN THE EVENT OF TRANSIENT MAINS VOLTAGE CHANGES

CROSS-REFERENCES TO RELATED APPLICATIONS

This application is the U.S. National Stage of International Application No. PCT/EP2008/053139, filed Mar. 17, 2008, which designated the United States and has been published as International Publication No. WO 2008/116769 and which claims the priority of German Patent Application, Serial No. 10 2007 014 728.9, filed Mar. 24, 2007, pursuant to 35 U.S.C. 119(a)-(d).

BACKGROUND OF THE INVENTION

The present invention concerns a method of and an apparatus for operating a double-fed asynchronous machine on a mains network upon transient mains voltage changes.

The double-fed asynchronous machine is preferably used in variable-speed systems, for example in high-efficiency wind power installations, as a wave generator or in conjunction with inertia mass storage devices and uninterruptable power supplies. In general the stator of the asynchronous machine is connected to the mains network and the rotor is connected to an inverter by way of slip rings. With such an inverter a target or reference value of an electrical parameter can be impressed on the rotor. The term inverter is to be interpreted broadly. In general in modern installations there is an inverter at the machine side and an inverter at the mains network side, which are connected together by way of an intermediate circuit. Besides voltage and current intermediate circuits, direct inverters are also possible, which manage without an intermediate circuit. Feed for the machine-side inverter is also possible by a dc voltage source or a dc source. The electrical parameter which is impressed on the rotor can be for example a voltage or a current. In general nowadays four-quadrant inverters with IGBTs are used. However other semiconductor switches such as GTOs and thyristors are also possible.

The advantage of the double-fed asynchronous machine over comparable systems lies in the reduced nominal load capacity of the inverter, in relation to the total power which can be fed into the mains network. As a result a system with a double-fed asynchronous machine enjoys comparatively good efficiency.

The amplitude and frequency of the rotor voltage are proportional to the slip of the machine. The slip is defined as the deviation of the mechanical rotary speed from the synchronous rotary speed with respect to the synchronous rotary speed. Typical speed ranges for the double-fed asynchronous machine are between 70% and 130% of the synchronous speed. In that working range in respect of rotary speed the required maximum rotor voltage is considerably lower than when the machine is stationary. The amplitude of the rotor voltage in the stopped condition is more than three times as great as with 30% slip. The absolute value of amplitude depends on the transformation ratio of the machine. The frequency of the induced rotor voltage in the stopped condition is equal to the mains frequency. In the typical speed range the frequency is at a maximum 30% of the mains frequency. The inverter is normally so designed that it can supply at a maximum the required voltage in the defined speed range.

In the course of the increasing number of wind power installations and the demands which are linked thereto and which are becoming ever higher, in respect of the mains network operators, the performance of the double-fed asynchronous machine is of increasing interest, in the case of transient changes in the mains voltage. In that respect transient changes are time-limited deviations in respect of the mains voltage from the steady-state value or from the nominal value. That can be both drops in voltage and also increases in voltage. In general these are called voltage jumps or transient voltage jumps. Drops in voltage can occur in that case for example due to short-circuits in the mains network. In that respect drops in voltage can in the extreme case occur down to 0%. Increases in voltage can occur with a non-compensated reactive power balance in the network, for example when large inductive loads are switched off.

In the case of a double-fed asynchronous machine the stator of the machine is connected directly to the mains network so that, upon a transient change in mains voltage, the stator voltage behaves in a corresponding fashion. The flux vector of the machine rotates in the steady-state condition with the mains frequency. In the case of a transient voltage change that involves a component of the magnetic flux, which is stationary relative to the stator and decreases again only after a number of mains periods. That stationary flux component, also referred to as a direct or steady component of the flux, is proportional to the change in the mains voltage vector. The direct or steady component of the flux induces in the rotor winding a considerably higher voltage than in the steady-state mains network mode of operation with a defined speed range. The inverter however is generally only designed for such a steady-state mains network mode of operation and is therefore not in a position to supply a corresponding counter-voltage. The consequence of this is that the response characteristic on the part of the double-fed system upon voltage jumps exhibits short circuit-like currents in the stator and in the rotor as well as a corresponding air gap torque. The simplest technical solution for an optimum response behavior on the part of the double-fed asynchronous machine would be to design the inverter for a rotor voltage which is necessary for compensation of a maximum mains voltage jump. It will be noted however that that would almost be equal to an inverter nominal load capacity corresponding to the total power of the system. That however nullifies the essential advantage of the double-fed system, namely the comparatively low nominal load capacity of the inverter.

Generally a so-called crowbar is used to protect the inverter of a double-fed asynchronous machine. That is a protective circuit with thyristors, by which the rotor can be short-circuited. The tripping criterion for the crowbar can be the fact of exceeding an admissible rotor current, an admissible intermediate circuit current or an admissible intermediate circuit voltage. As already explained a transient mains voltage change can lead to inadmissibly high rotor currents. Correspondingly the voltage induced in the rotor in the case of transient mains voltage changes can also lead to a feed of energy into the intermediate circuit and thus an increase in the intermediate circuit voltage or the intermediate circuit current. The crowbar admittedly protects the inverter from damage to the intermediate circuit, but the use thereof has serious disadvantages in regard to the overall performance of the double-fed asynchronous machine:

A normal mode of operation, controlled by the inverter, of the double-fed asynchronous machine, for example with regulation of the active and reactive power delivery to a fixed value or regulation on the basis of other parameters, is no longer possible during activation of the crowbar. With the rotor short-circuited the machine acts like an asynchronous machine with a squirrel-cage rotor winding, that is to say the machine receives inductive reactive power from the mains network in dependence on the rotary speed and takes active power from the mains network or delivers same. If in the course of a transient mains voltage change the crowbar is activated then generally at least 100 ms elapses after the end of the change in voltage before a defined mode of operation, for example with active and reactive power regulation, is possible again. That means that the requirements of the mains network operators, for also actively regulating active and reactive power in the case of transient voltage changes, cannot be met. There may also be a requirement that, instead of active and reactive power, other corresponding parameters such as mains voltage, power factor, moment or apparent power are to be regulated.

As already mentioned, the short-circuit-like currents in the case of transient mains voltage changes lead to a corresponding air gap torque. Such a torque loads the drive train and the transmission. The torque acting on the drive train and the transmission is further increased by the use of the crowbar. It is not just the amount of the torque that is critical in that case, but also the alternating components which occur in respect of the torque and which occur to a particular degree in the case of asymmetrical mains network faults. Such torque loadings in the normal case admittedly do not lead to direct damage, but with a corresponding frequency thereof the service life of the transmission and other components of the drive train can be considerably reduced.

WO 2004/030199 describes an apparatus for the continuous feed of energy into the mains network with a double-fed asynchronous machine in the event of abrupt mains voltage changes. The apparatus includes an electronic switch in the stator circuit, by which the stator is temporarily separated from the mains network upon voltage changes. That apparatus suffers from the disadvantage that the machine has to be synchronized with the mains network again.

The publication by A Causebrook, D J Atkinson and A G Jack 'Fault Ride-Through: Shifting the Balance of Power from Blade Pitch to Electrical Resistance', Athens, EWEC 27.02.-02.03.2006, discloses an arrangement having an electronic switch and a parallel resistor. In that arrangement in the case of a mains fault the resistor is connected into the mains network path and thus permits electrical energy to be conducted out of the machine. Such an arrangement is really good in limiting the current and torque peaks occurring immediately after the fault occurs. To ensure decay of the time alternating components of current and torque however quite long switch-on times are required for the resistor. The required switch-on times for realistically designed resistors are markedly above 20 ms. That is the time after which energy supply companies require regulated operation with the delivery of defined active and reactive power. With longer switch-on times for the resistor it can further happen that not only active power is taken from the machine, as is desired, but also from the mains network. The latter is even prohibited in some mains connection guidelines.

Besides circuitry solutions, considerations relating to the regulating methods for a double-fed asynchronous machine in relation to performance in the case of transient mains voltage changes are also to be found in the state of the art, thus also in the document by Jorun I Marvik, Torstein Bjrgum, Bjarne I Naess, Tore M Undeland and Terje Gjengedal 'Control of a Wind Turbine with a Doubly Fed Induction Generator after Transient Failures', NOEPIE 14.-16.02.2004. Here the performance of a reactive power regulator and a flux regulator are compared together.

WO 2006/030183 discloses a stator voltage and stator power regulation with a subordinated rotor flux regulation for the regulation of the double-fed asynchronous machine in the case of steady-state mains voltage and additional auxiliary regulators for optimizing the performance in the case of transient mains voltage changes.

It is to be seen from the aforementioned state of the art that flux regulation of an electric machine or a double-fed asynchronous machine is known both in the steady-state and also in the transient condition. In that case the reference or target value is generated for the flux to be regulated from a superordinated regulator or is set to a constant value or—in the case of a transient mains voltage change—to a quasi-steady-state value.

SUMMARY OF THE INVENTION

An object of the present invention is to reduce the mechanical loading of the drive train in the case of transient mains voltage changes in operation of a double-fed asynchronous machine on a mains network in which various kinds of transient mains voltage changes occur.

To attain that object, there is proposed a method of operating a double-fed asynchronous machine upon transient mains voltage changes, in which the stator is connected to the mains network and the rotor is connected to an inverter, and in which the inverter is adapted to impress a reference value of an electrical parameter on the rotor, in which immediately after detection of a transient mains voltage change a reference value of the electrical parameter, that is determined at least from the rotor flux and the stator flux, is impressed on the rotor in such a way that an active reduction in the torque occurring during the transient mains voltage change is achieved. In accordance with the invention a defined operation in the respective normal regulation mode, for example with active and reactive power regulation, is already made possible again quickly after a mains voltage change.

In accordance with a preferred embodiment of the invention after detection of a transient mains voltage change the reference value of the electrical parameter, that is determined at least from the rotor flux and the stator flux, is impressed on the rotor in such a way that in addition an active reduction in the rotor current occurring during the transient mains voltage change is achieved. It is thus possible to ensure an equally optimum performance in respect of the magnitude of the rotor current and the torque.

In particular, in accordance with an embodiment of the invention, a reduction in rotor current and torque, which is equally optimum for all kinds of mains faults, is achieved by suitable weighting for example of the stator flux vector and the rotor flux vector (for example in a ratio of 40% to 60%). That is effected on the boundary condition that the available control parameter (for example rotor voltage) is limited.

The method according to the invention is independent of regulation of the double-fed asynchronous machine in the steady-state mode of operation. In the steady-state mode of operation there is generally a requirement for regulation of the active and reactive power to be received or delivered. Alternatively regulation can also be demanded in respect of other corresponding parameters such as mains voltage, power factor, moment or apparent power. Known methods can be used for that purpose. It is only after the detection of a transient mains voltage change that the situation is switched over to the method according to the invention.

The short-circuit-like currents and the corresponding torque which generally occur with transient mains voltage changes can thus be reduced in the shortest possible time and regulation can be changed over again to active and reactive power regulation or to another steady-state regulation strategy.

The regulation according to the invention is activated only for a short time after detection of a transient mains voltage change and otherwise a standard regulation method, for example for regulation of active and reactive power, is used. In an advantageous configuration of the invention the reference value of the electrical parameter which is to be impressed in the rotor to provide for optimum control of the rotor flux in the case of a mains network fault is already continuously calculated in the steady-state mode of operation. That can avoid a relatively great time delay which occurs if the electrical parameter is determined only after detection of a transient mains voltage change.

There are still further machine parameters, the product of which is proportional to the torque and which can consequently be used instead of rotor flux and stator flux: it is for example possible, and embraced by the invention, to use a respective one of the space vectors for rotor current, rotor flux, stator current or stator flux with suitable weighting for determining the rotor reference value, just like the stator voltage vector in conjunction with the rotor current or rotor flux vector.

In accordance with a further embodiment of the invention the electrical parameter which is impressed on the rotor is the rotor voltage. The most common inverter topology suitable for that purpose, for a double-fed asynchronous machine, is the four-quadrant inverter with IGBTs and a dc voltage intermediate circuit. With other inverter topologies, it may be appropriate to select the rotor current as the electrical parameter which is impressed in the rotor.

In accordance with a further preferred embodiment of the present invention the reference value of the rotor voltage vector which is impressed in the rotor is ascertained from at least one component of the difference vector from the vector of the rotor flux and from the vector of the stator flux.

In accordance with a further preferred embodiment of the present invention the reference value of the rotor voltage vector is proportional to the difference vector from the rotor flux vector and the stator flux vector.

In accordance with a further preferred embodiment of the present invention, because of the natural limit on the magnitude of the rotor voltage, weighting is effected to the benefit of the component of the difference vector from rotor flux vector and stator flux vector which is perpendicular to the stator flux vector.

In accordance with a further preferred embodiment of the present invention, for the same reason weighting is effected to the benefit of the component of the difference vector from the rotor flux vector and the stator flux vector which is parallel to the stator flux vector.

An inverter with IGBTs or other semiconductor switches can only switch discrete states. A three-phase bridge circuit can assume eight discrete states. In the rotary vector modulation method various discrete states are assumed during a sampling period for a respective given time, more specifically in such a way that the mean value of the rotary vector corresponds to the reference value as well as possible. It is thus possible to generate continuous voltage values. In the case of a transient mains voltage change the inverter must deliver a counter-voltage that is as high as possible, in relation to the voltage induced by the stator flux in the rotor winding. In accordance with a further preferred embodiment of the present invention therefore during a sampling period only one discrete switching state of the inverter is switched, that switching state being selected whose phase position is closest to the phase position of the reference value of the rotor voltage. In that way the maximum possible amount of voltage with the inverter is impressed into the rotor. The fault which occurs in that case in the phase position of the voltage can be disregarded in this context as the angular deviations from the reference vector statistically balance out over time.

The rotor flux and the stator flux are not parameters which can be directly measured and are therefore calculated by means of an observer. In that case, in accordance with a suitable model, the instantaneous time values of the stator and rotor flux vectors can be calculated just like the quasi-steady-state vectors. The latter denote the stator flux and rotor flux vectors if the instantaneous value of the stator voltage were to persist so long that all compensation processes have died away. In accordance with a further embodiment of the present invention the transient rotor flux and the quasi-steady-state stator flux are used for determining the reference value of the rotor voltage. The use of the transient stator flux requires a higher level of computing expenditure and involvement but also gives more accurate results. In accordance with another embodiment therefore the transient rotor flux and the transient stator flux are used to determine the reference value of the rotor voltage.

The observer for determining the rotor and stator flux calculates the parameters which are not directly measurable, from directly measurable parameters. In accordance with a preferred embodiment the rotor flux and the stator flux are calculated from at least one respective one of the measured parameters of stator voltage, stator current and rotor current. Depending on the respective kind of the model used a measured parameter is sufficient, as for example in the case of the quasi-steady-state stator flux. With more accurate models two or all the stated measurement parameters may also be required.

When hereinbefore the stator voltage, stator current and rotor current but not the rotor voltage are mentioned as available measurement parameters, that involves the implementation of the invention in the case of a double-fed asynchronous machine, in which the rotor voltage is controlled at the inverter side, for which reason the rotor voltage in that case represents a control parameter and is therefore generally not available as a measurement parameter. With alternative control systems—for example with a rotor current control—it is however also possible to take account of the rotor voltage as a measurement parameter.

Furthermore, to attain the stated object, there is proposed an apparatus which has an inverter and at least one control unit and in which the control unit has means by which a reference value of the electrical parameter is determined from the rotor flux and the stator flux in such a way that an active reduction in the torque occurring during the transient mains voltage change is achieved, wherein after detection of a transient mains voltage change the reference value of the electrical parameter is impressed into the rotor.

With the apparatus according to the invention the inverter can be operated with only one control unit. It is however also possible to use separate control units for a machine-side inverter and a mains network-side inverter. Each control unit can have one or more microcontrollers or microprocessors. The control unit further has suitable output interfaces for transfer of the actuation signal to the inverter.

In an embodiment of the apparatus according to the invention the electrical parameter which is impressed into the rotor is the rotor voltage.

In accordance with an embodiment of the apparatus according to the invention the means determine the reference value of the rotor voltage vector from at least one component of the difference vector from the vector of the rotor flux and the vector of the stator flux.

In accordance with a further embodiment of the apparatus according to the invention the reference value of the rotor voltage vector is proportional to the difference vector from the rotor flux vector and the stator flux vector.

In accordance with a further embodiment of the apparatus according to the invention the reference value of the rotor voltage does not exceed an established value and the means implement weighting to the benefit of that component of the difference vector from the rotor flux vector and the stator flux vector, which is perpendicular to the stator flux vector.

In accordance with a further embodiment of the apparatus according to the invention the reference value of the rotor voltage does not exceed an established value and the means implement weighting to the benefit of that component of the difference vector from the rotor flux vector and the stator flux vector, which is parallel to the stator flux vector.

In accordance with a further embodiment of the apparatus according to the invention only one discrete switching state of the inverter is switched by means of the control unit during a sampling period and the means select the switching state whose phase position is closest to the phase position of the reference value of the rotor voltage.

In accordance with a further embodiment of the apparatus according to the invention the means for determining the reference value of the rotor voltage use suitable weighting of the transient rotor flux and the quasi-steady-state stator flux.

In accordance with a further embodiment of the apparatus according to the invention the means for determining the reference value of the rotor voltage use suitable weighting of the transient rotor flux and the transient stator flux.

In accordance with a further embodiment of the apparatus according to the invention the rotor flux and the stator flux are calculated from at least a respective one of the measured parameters of stator voltage, stator current and rotor current (and optionally rotor voltage). Suitable measurement transducers can be used for that purpose. The control unit has suitable input interfaces for receiving the data.

In accordance with a further embodiment of the apparatus according to the invention a controllable series impedance is arranged in the mains network path of the double-fed asynchronous machine. Such a controllable series impedance comprises an impedance and a parallel switch. An ohmic resistor which can take energy from the machine can be considered as the impedance. An inductive component can additionally limit the current rise. Preferably an electronic switch is considered as the switch as suitably fast reaction times are required to attain the object of the invention, and they can scarcely be embodied with a mechanical switch, for example a relay. Preferably an active semiconductor switch is used for that purpose, such as for example a GTO. It is however also possible to use thyristors with a suitable quenching circuit. In normal operation the switch is conducting and the impedance is short-circuited. After detection of a transient mains voltage change the switch is opened and the impedance is switched into the network path. Alternatively, clock-controlled operation of the electronic switch is also possible so that the impedance values are adjustable. The impedance provides in particular immediately after the occurrence of the transient mains voltage fault for an additional reduction in torque.

In accordance with a further embodiment of the apparatus according to the invention a controllable series impedance is arranged in the stator path of the double-fed asynchronous machine. Firstly, the same advantages apply as for an arrangement of the series impedance in the network path. In addition, an arrangement in the stator path enjoys the advantage that the electronic switch has to be designed for a lower level of power. On the other hand the network-side inverter remains connected directly to the mains network so that reactive power can be delivered into the network by way of the network-side inverter even during a transient mains voltage jump. Those advantages apply irrespective of whether a suitable reference value is impressed into the rotor at the same time.

In accordance with a further embodiment of the apparatus according to the invention the inverter has a voltage intermediate circuit to which a circuit with a resistor for reducing the intermediate circuit voltage is connected to the voltage intermediate circuit. Such a circuit is also referred to as an intermediate circuit chopper. Such an intermediate circuit chopper can be used alternatively or additionally to a series impedance in the network or stator path. Active power is actively taken from the generator by a reference value of an electrical parameter being impressed into the rotor, which is determined by suitable weighting for example from a stator flux vector and a rotor flux vector (for example in a ratio of 40% to 60%). That active power can be received by the chopper resistor. The intermediate circuit chopper additionally involves protection from an inadmissibly high rise in the intermediate circuit voltage.

BRIEF DESCRIPTION OF THE DRAWING

Further configurations of the invention are to be found in the description and the appendant claims. The invention is described in greater detail hereinafter by means of embodiments by way of example with reference to the accompanying drawings in which:

DETAILED DESCRIPTION OF PREFERRED EMBODIMENTS

Figure 1:
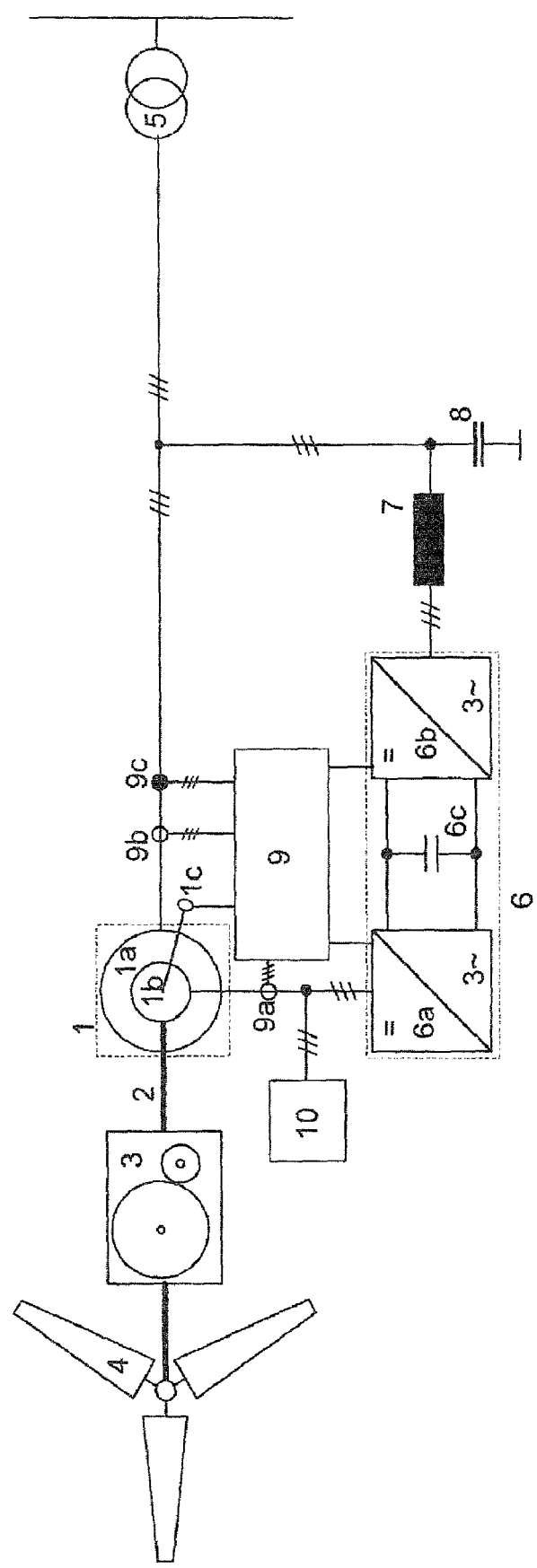
FIG. 1 shows the diagrammatic structure of a double-fed asynchronous machine with a four-quadrant inverter and a voltage intermediate circuit.

FIG. 1 diagrammatically shows a system with a double-fed asynchronous machine 1. The double-fed asynchronous machine 1 has a stator 1a and a rotor 1b. A position sender 1c is also mounted to the machine. The rotor of the asynchronous machine is coupled mechanically by way of a shaft 2 and a transmission 3 to a drive. The drive shown in FIG. 1 represents the rotor blades 4 of a wind power installation. The stator 1a is connected to the mains network by way of a mains transformer 5. The rotor 1b is electrically connected to an inverter 6 and the inverter 6 is connected by way of a choke 7 and a mains filter 8 to the mains transformer 5. The inverter 6 includes a machine-side inverter 6a and a network-side inverter 6b which are coupled together by way of a voltage intermediate circuit 6c. The inverter 6 is actuated by way of a control unit 9. FIG. 1 also shows the measurement locations for rotor current 9a, stator current 9b and stator voltage 9c. The measurement values are passed to the control unit 9. The rotor position is also made available to the control unit 9, by the position sender 1c. A crowbar 10 is arranged between the machine-side inverter 6a and the rotor to protect the inverter 6.

Figure 2:
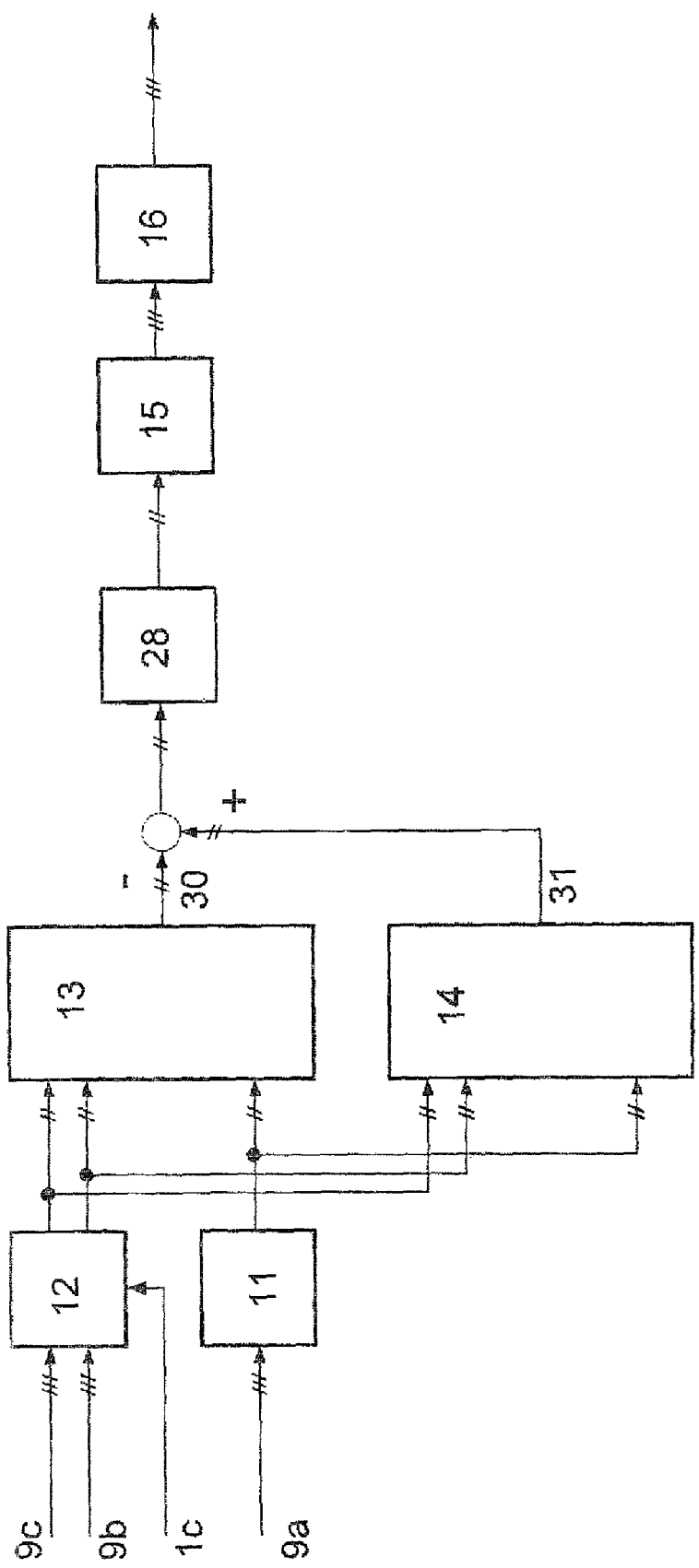
FIG. 2 shows a diagrammatic view of the method according to the invention of determining a voltage which is impressed into the rotor.

A standard regulating method is used during the normal steady-state operation. FIG. 2 shows an embodiment of a regulating method according to the invention, to which the system is switched over after detection of a transient mains voltage change. The measurement parameters required for the observer for determining stator flux and rotor flux can be processed in various co-ordinate systems. As the parameter to be impressed is already a rotor parameter, it is appropriate also to select a rotor-oriented, winding-fixed co-ordinate system. That generally saves on a re-transformation step for the reference value which is to be impressed in the rotor 1b. The rotor current 9a is already a rotor parameter. A transformation block 11 only transforms the measurement parameter from the three-phase system into a two-phase Cartesian co-ordinate system. The stator current 9b and the stator voltage 9c are firstly transformed in the transformation block 12 from the three-phase system into a two-phase, stator-oriented, Cartesian co-ordinate system, and then transferred by means of the rotor position angle 1c into the two-phase rotor-oriented co-ordinate system. The transformation series can in principle also be effected in the reverse fashion. The measurement parameters are then available for transfer to the observer 13 for determining the rotor flux and the observer 14 for determining the stator flux. Depending on the respective model used not all those parameters are required; particularly when using the quasi-steady-state stator flux knowledge of the stator voltage is sufficient. The quasi-steady-state stator flux vector $\underline{\Psi}_{stator}$ is then afforded by equation (1):

$$\underline{\Psi}_{stator} = \frac{U_{stator}}{j\omega_{stator}} \quad (1)$$

In that respect $U_{stator}$ denotes the stator voltage vector and $\omega_{stator}$ denotes the stator circuit frequency.

The output 30 of the observer 13 is subtracted from the output 31 of the observer 14. The result corresponds to the difference vector out of the vector of the rotor flux and the vector of the stator flux in a two-phase, rotor-oriented co-ordinate system. To generate a voltage value from the flux difference, multiplication with a proportionality factor is still required in the block 28. The voltage value ascertained in that way is then transformed to the three-phase system again in the re-transformation block 15. In the block 16, a firing pattern for the inverter is generated from the three-phase rotor voltage reference value. That can occur for example by means of pulse width modulation.

Figure 3:
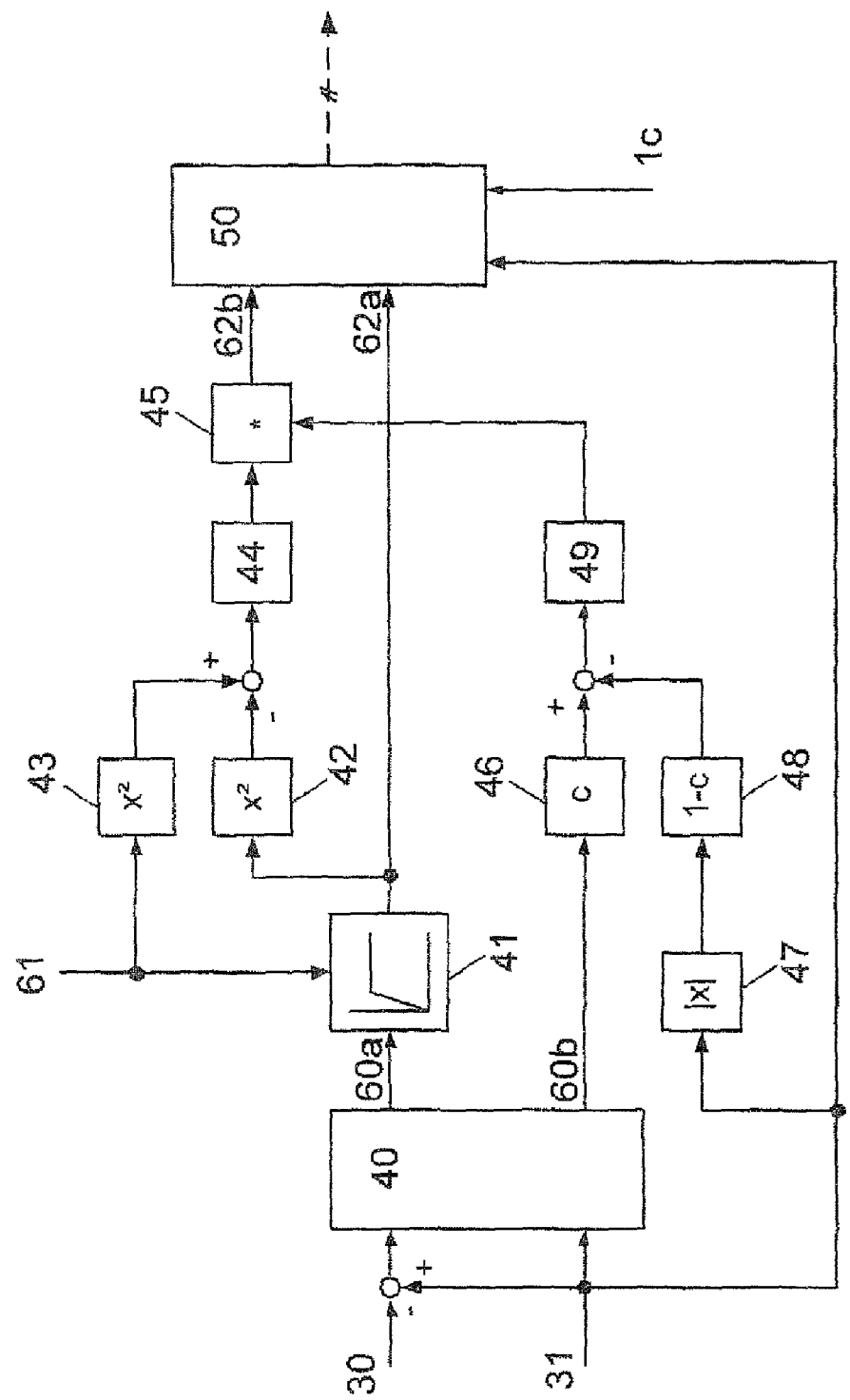
FIG. 3 shows a diagrammatic view of an embodiment of weighting to the benefit of a component of the difference vector from rotor flux and stator flux.

FIG. 3 shows a diagrammatic view of an embodiment of the weighting operation to the benefit of a component of the difference vector from the rotor flux and the stator flux. In the illustrated embodiment the difference of the stator flux 31 and the rotor flux 30 is fed to a transformation block 40. The transformation block determines a component 60a of the difference vector perpendicularly to the stator flux and a component 60b parallel to the stator flux. The stator flux 31 itself is still required for that transformation step. Instead of the component 60a of the difference vector perpendicularly to the stator flux it would also be possible in that respect to use the component of the rotor flux vector 30 perpendicularly to the stator flux. The component perpendicular to the stator flux is further processed by way of the characteristic 41. Such a characteristic could be for example a linear function with a limitation to an established value in respect of the rotor voltage 61. The characteristic 41 then generates the component of the rotor voltage 62a perpendicular to the stator flux. Establishing the rotor voltage component 62b parallel to the stator flux is effected by geometrical subtraction of the perpendicular rotor voltage component 62a from the rotor voltage limit value 61. For that purpose the perpendicular rotor voltage component in the block 42 and the rotor voltage limit value in the block 43 are squared, the results are subtracted from each other and the square root is calculated from the difference in the block 44. Multiplication with a sign is then also effected by means of the block 45. At the output of the block 45, that gives the component 62b of the rotor voltage parallel to the stator flux. The sign can either be so selected that the voltage component 62b contributes to approximating the rotor flux to the stator flux, or in such a way that the stator flux is reduced.

The sign can be influenced by means of a weighting factor c. The component 60b of the difference vector from the stator flux and the rotor flux parallel to the stator flux is multiplied in block 46 by the factor c. Block 47 determines the magnitude of the stator flux and block 48 multiplies that magnitude by the factor (1−c). The result is taken off from the output of the block 46 and the sign is determined in the block 49. The sign is then made available to the multiplication block 45. If the factor c=1 is selected, only an approximation of stator flux and rotor flux is assisted. If the factor c=0 is selected the rotor voltage component parallel to the stator flux is only used to reduce the stator flux. The rotor voltage components 60a and 60b then have to be transformed into a rotor-fixed co-ordinate system in the transformation block 50. The stator flux 31 and the rotor position 1c are used for that purpose.

Figure 4:
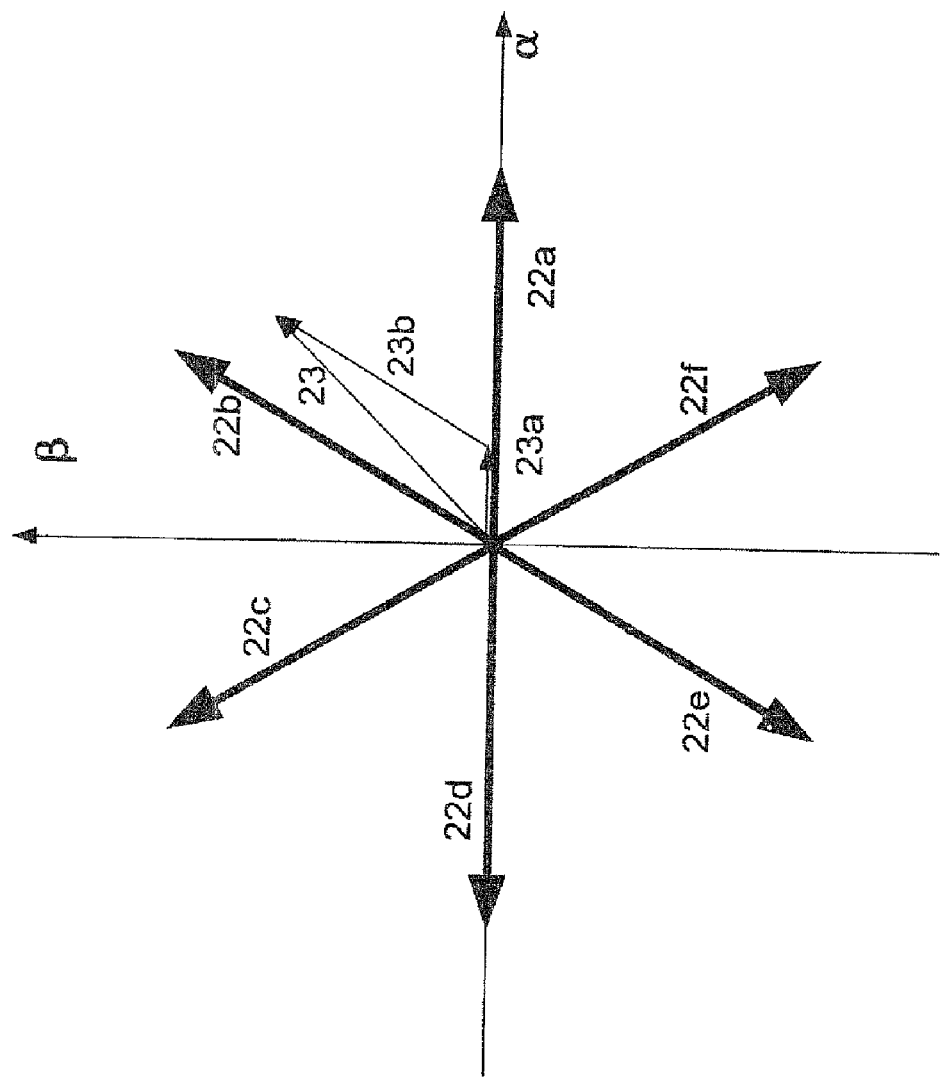
FIG. 4 shows a diagrammatic view of the possible switching states of a three-phase bridge circuit and the mode of operation of rotary vector modulation.

The three-vector modulation operation affords a possible way of implementing pulse width modulation. A three-phase bridge circuit can assume eight discrete switching states. FIG. 4 shows a space vector representation of the possible switching states. Six switching states are represented by the vectors 22a to 22f. Two further switching states (not shown) give the zero vector.

To produce a rotary vector $\underline{u}$ 23, the vector $^1\underline{U}$ 22a is firstly switched for a given time duration $t_1$ during the sampling period T. That on average in accordance with equation (2) gives the rotary vector $^1\underline{u}$ 23a:

$$^1\underline{u} = \frac{t_1}{T}{}^1\underline{U} \quad (2)$$

For a subsequent time duration $t_2$ the vector $^2\underline{U}$ 22b is switched. That on average in accordance with equation (3) during the time duration $t_2$ gives the vector $^2\underline{u}$ 23b:

$$^2\underline{u} = \frac{t_2}{T}{}^2\underline{U} \quad (3)$$

In addition a zero vector $t_0$ is switched for a time $t_0$. During the sampling period T that is followed on average by the desired vector $\underline{u}$ 23. The calculation is shown by equation (4):

$$\underline{u} = {}^1\underline{u} + {}^2\underline{u} + \underline{u}_0 \quad (4)$$

The total of the switch-on times for the three vectors gives the period duration:

$$T = t_1 + t_2 + t_o \quad (5)$$

Figure 5:
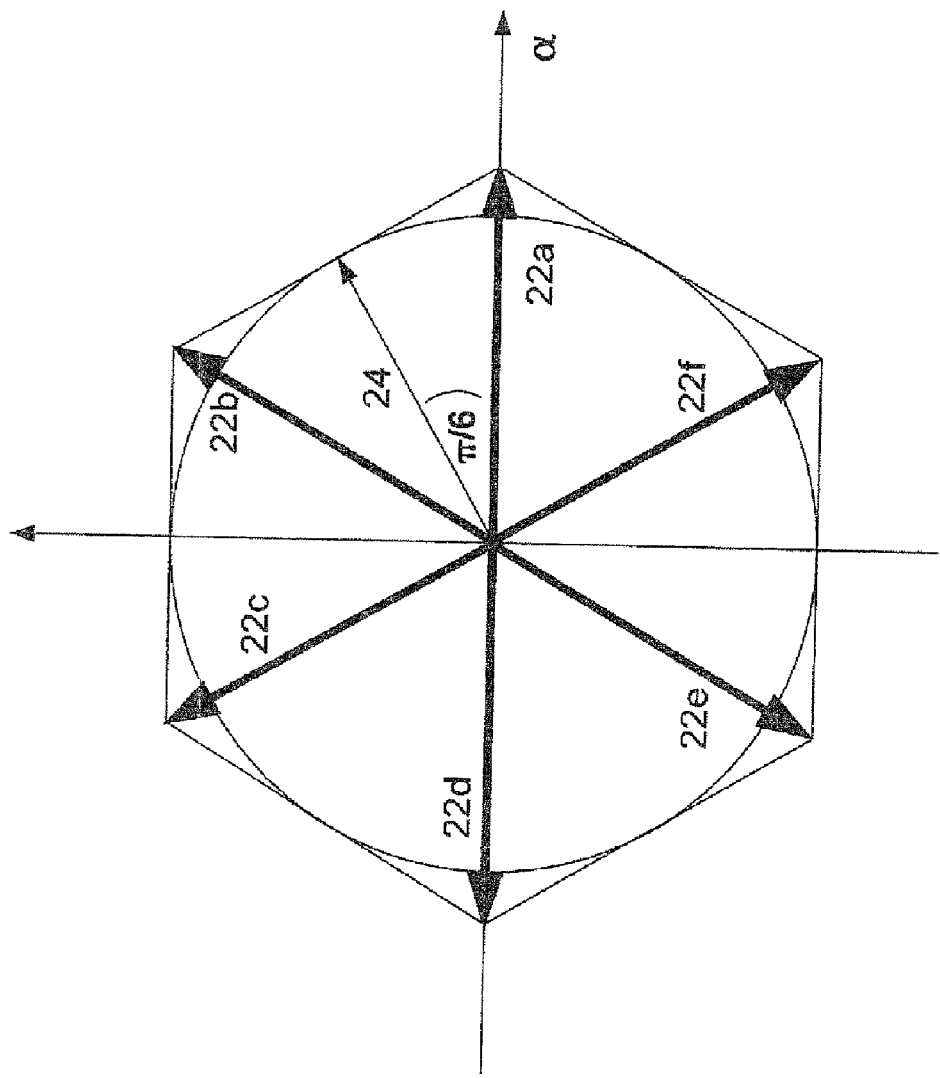
FIG. 5 shows a diagrammatic view of the possible switching states of a three-phase bridge circuit and the maximum vector length.

The circular line shown in FIG. 5 represents the limit of the control range which is possible with rotary vector modulation. The maximum vector length is determined by the rotary vector 24 with the angle $\pi/6$. For that vector the total of the times $t_1$ and $t_2$ is at a maximum. The control range which is possible in principle with the inverter is characterized by the hexagon shown in FIG. 5. It will be seen that, for phase positions in the proximity of the discrete switching states, when using rotary vector modulation, the control range is correspondingly restricted with respect to the control range which is possible with the inverter.

Figure 6:
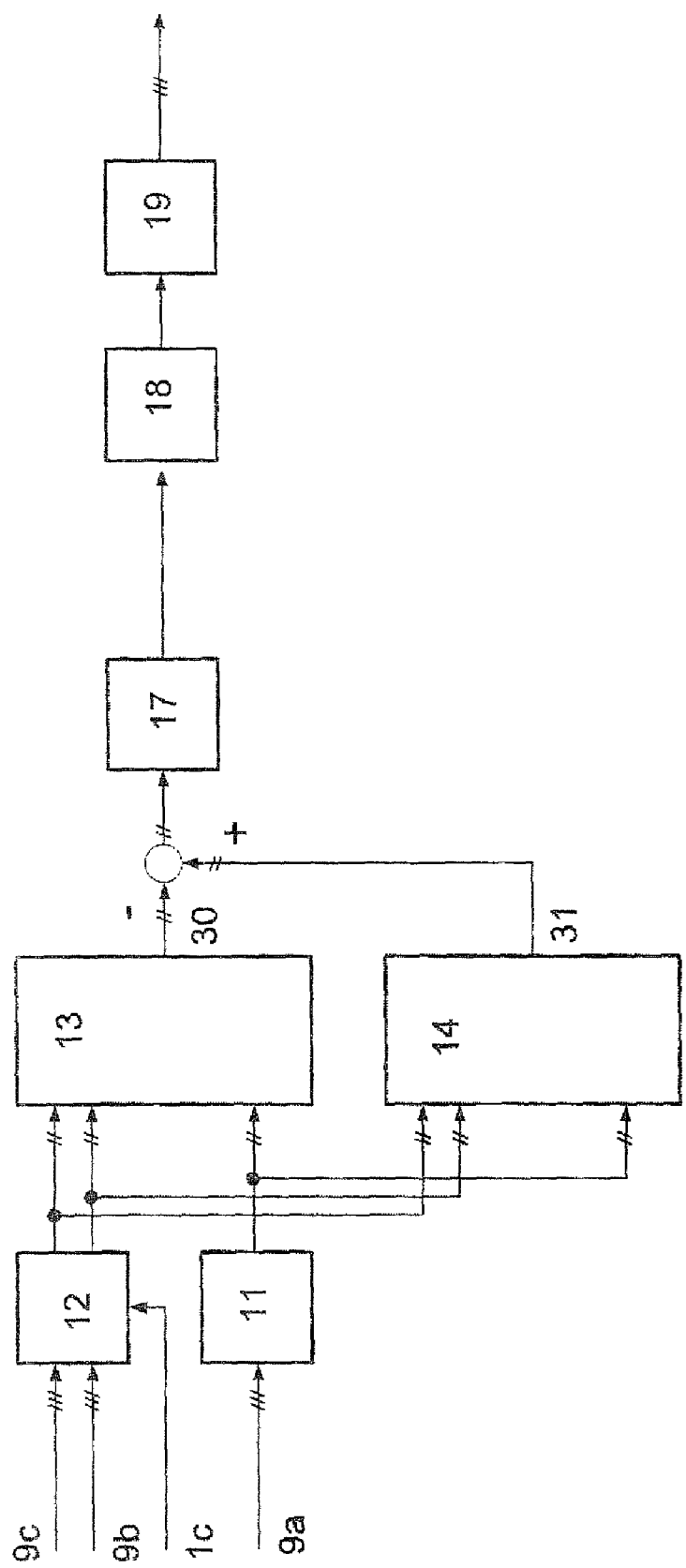
FIG. 6 shows a diagrammatic view of the method according to the invention of ascertaining a discrete switching state.

In the case of a transient mains voltage change generally a rotor voltage which is as high as possible is required. It is therefore particularly advantageous for the reference value of the rotor voltage, which is ascertained by the method or the apparatus according to the invention, not to be switched by means of rotary vector modulation or a comparable method, but to use that of the six discrete switching states 22a to 22f, which is closest to the phase position of the rotor voltage reference value, throughout the entire sampling period. That achieves the maximum possible voltage magnitude. A diagrammatic view of such a method is shown in FIG. 6. In accordance with the method shown in FIG. 2 the rotor voltage reference value is formed from the difference in the observer outputs 30 and 31. Multiplication by a proportionality factor is not required here as in this embodiment of the method and apparatus according to the invention the only important consideration is the phase angle of the rotor voltage. The proportionality factor is thus established at the value one. Block 17 determines the phase angle of the rotor voltage from the Cartesian co-ordinates. Block 18 determines therefrom the closest space vector for one of the discrete switching states and block 19 generates the corresponding firing pattern for the rotor-side inverter.

Figure 7:
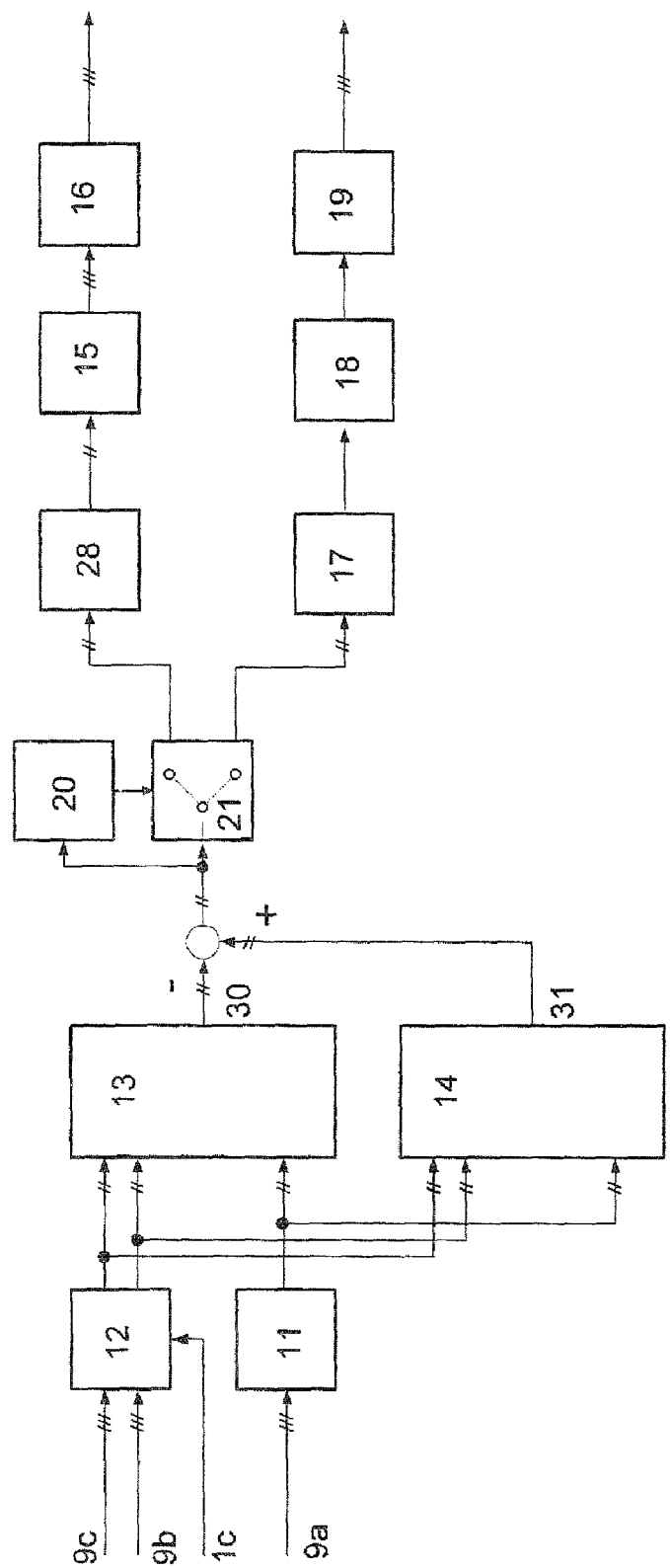
FIG. 7 shows a diagrammatic view of the method according to the invention which can switch over between the use of discrete switching states and continuous angle positions.

FIG. 7 shows the combination of a method with discrete and continuous angle positions. In most cases, in the event of transient mains voltage changes, the maximum available rotor voltage is required. In the case of smaller voltage changes however it is also possible that a lower rotor voltage than the maximum possible one is sufficient for approximating the rotor flux to the stator flux.

In that case an excessively great voltage would be generated by switching only one discrete state during a sampling period. For that reason, switching over can be effected by the switching device 21 between a method with pulse width modulation and a method with discrete switching states, during a sampling period. The switching device 21 is actuated by the evaluation device 20. That determines the magnitude of the rotor voltage reference value and switches over between the methods in dependence on that magnitude.

Figure 8:
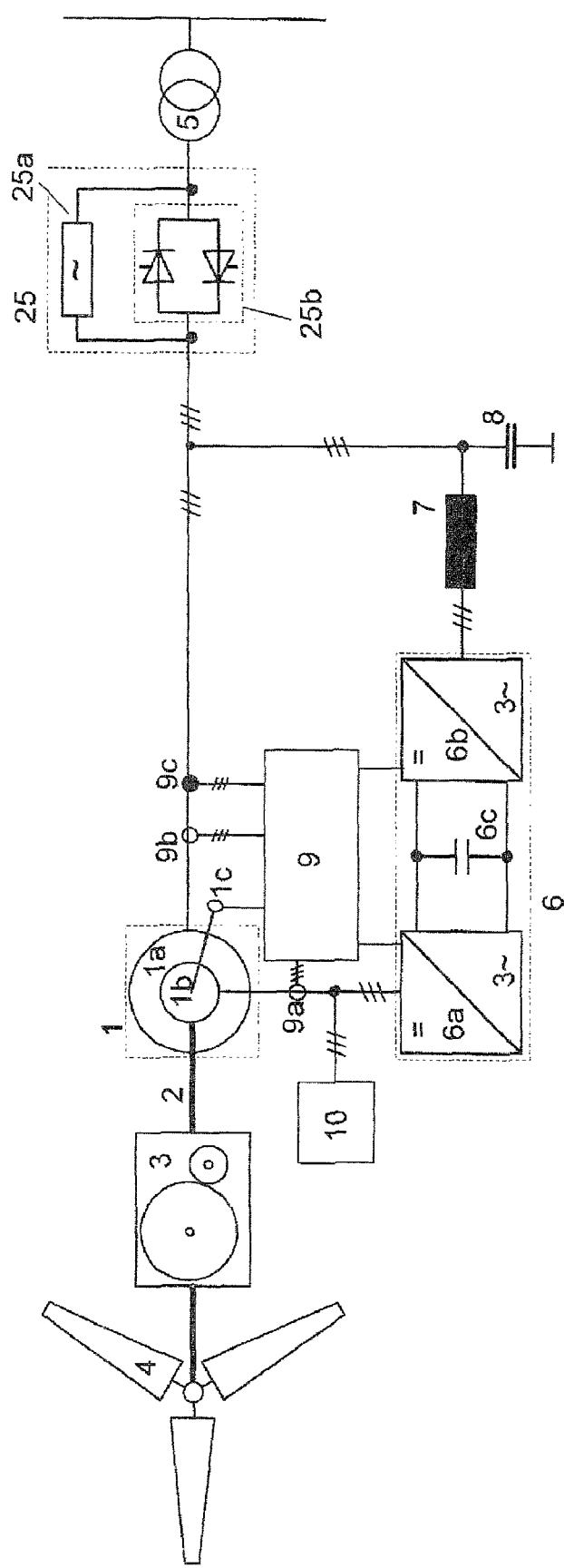
FIG. 8 shows a diagrammatic view of a double-fed asynchronous machine with controllable series impedance in the network path.

FIG. 8 shows an arrangement of a double-fed asynchronous machine with a controllable series impedance 25 in the network path. That means that the controllable series impedance is arranged between the interconnection point of the stator and the network-side inverter and the network. The controllable series impedance 25 is made up of the actual impedance 25a and an electronic switch 25b. The electronic switch comprises two antiparallel thyristors per phase. A quenching circuit (not shown here) can additionally be required for rapid quenching of the thyristors. If self-quenching GTOs are used it is in principle possible to dispense with a quenching circuit.

Figure 9:
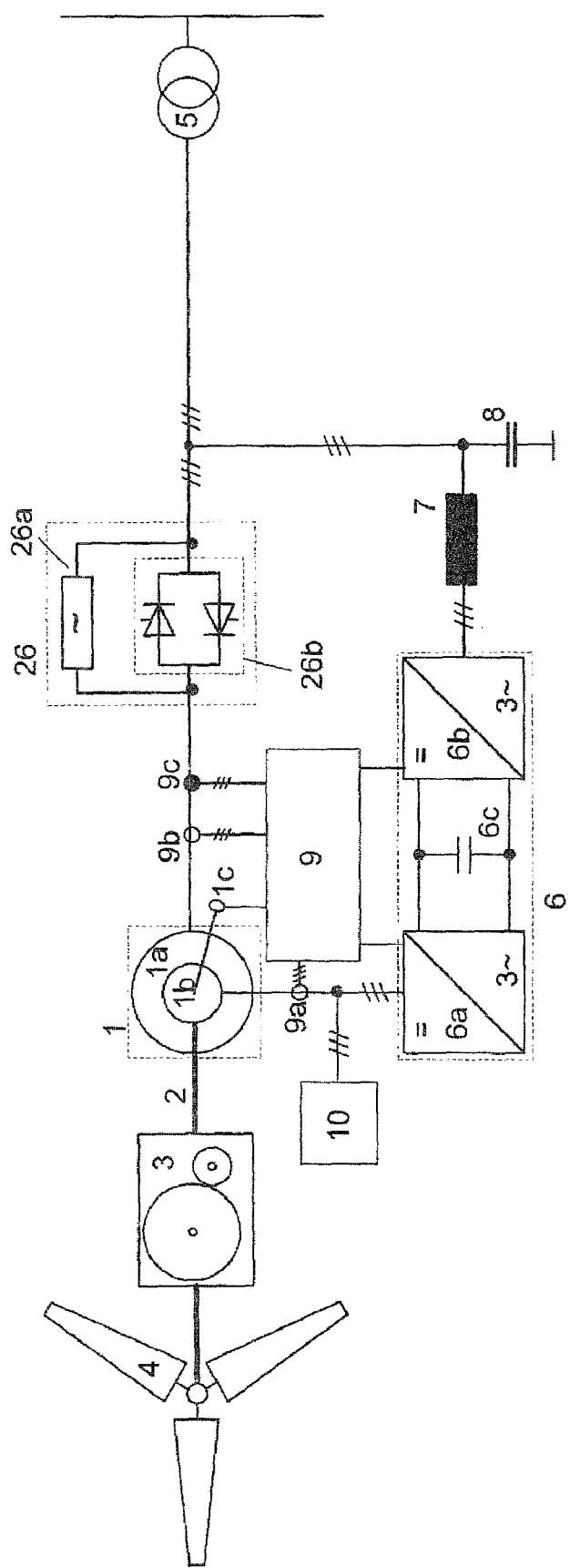
FIG. 9 shows a diagrammatic view of a double-fed asynchronous machine with controllable series impedance in the stator path.

FIG. 9 shows an advantageous development. Here the controllable series impedance 26 is connected not in the network path but in the stator path, in other words the impedance is connected between the stator connecting terminals and the interconnection point of the network-side inverter and the network. The structure in principle of the controllable series impedance in the network path 25 and in the stator path 26 is identical. In particular the electronic switch 26a but also the impedance 26b can however be designed for a lesser power loss. For the switch the reduction in power loss, depending on the respective slip range, is about 25% and thus signifies a considerable cost saving.

Figure 10:
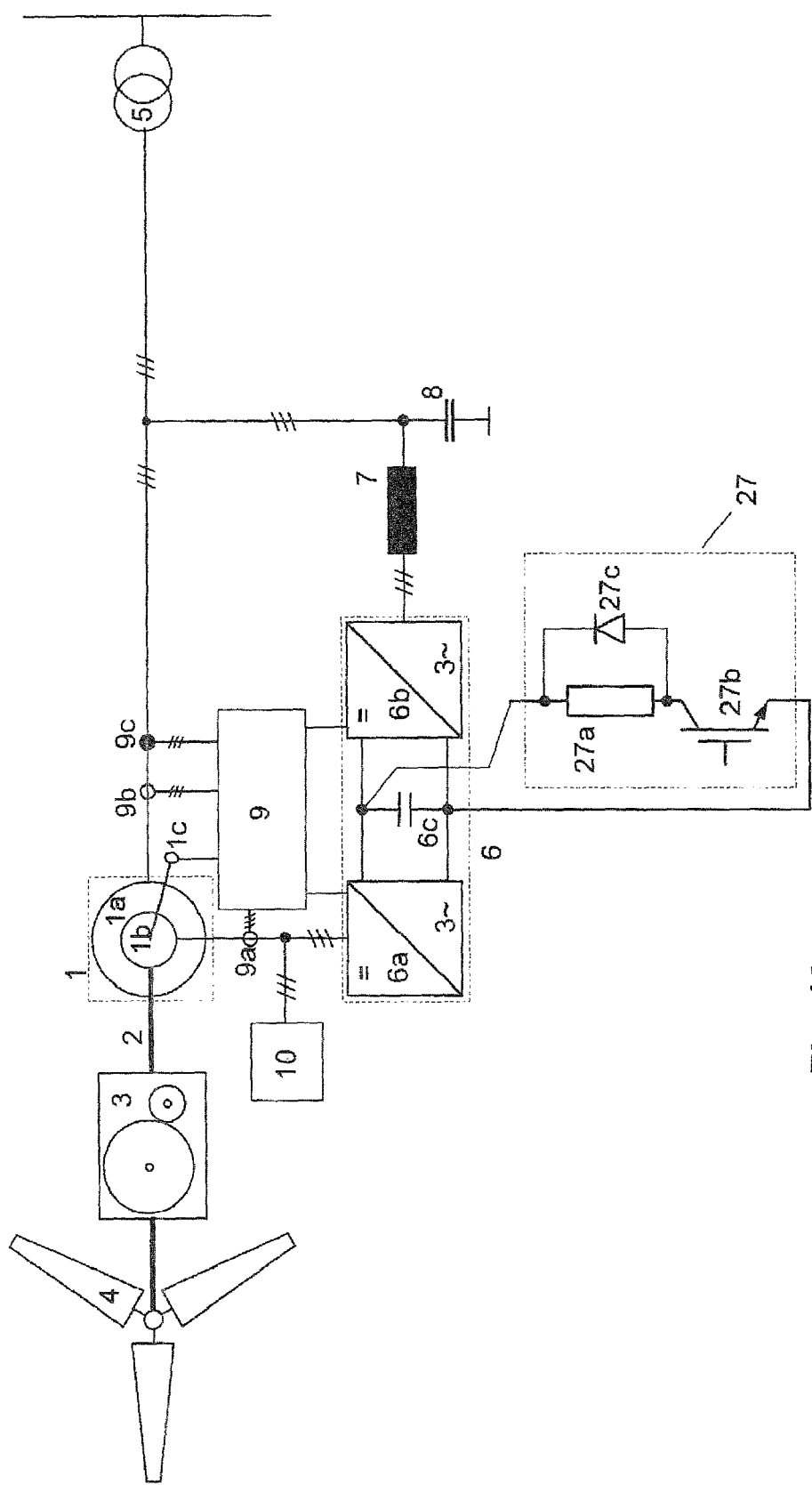
FIG. 10 shows the diagrammatic structure of a double-fed asynchronous machine with a four-quadrant inverter, voltage intermediate circuit and intermediate circuit chopper.

FIG. 10 shows a possible way of dissipating excess energy out of the intermediate circuit 6c and thus indirectly also out of the machine. An intermediate circuit chopper 27 is connected to the intermediate circuit 6c. The intermediate circuit chopper 27 is essentially made up of a resistor 27a and an electronic switch 27b. An IGBT is used as the switch in the illustrated example. In addition a free-running diode 27c is arranged across the resistor 27a. It is required by virtue of the parasitic inductances which are always present, to avoid overvoltages when the switch 27b switches off. The IGBT 27b is switched on as soon as an admissible voltage value is exceeded in the intermediate circuit, and switched off again when the value has fallen to a defined value. Additionally or alternatively, power can be delivered from the intermediate circuit into the network in the event of transient mains voltage changes, by fast regulation of the network-side inverter.

What is claimed is:

1. A method of operating a double-fed asynchronous machine with a stator connected to a mains and a rotor connected to an inverter, the method comprising the steps of:
    detecting a transient change in a mains voltage,
    obtaining or measuring a rotor parameter and a stator parameter;
    transforming the obtained or measured rotor parameter and stator parameter from a three-phase system into a two-phase system, producing a stator flux vector and a rotor flux vector;
    computing from the stator flux vector and the rotor flux vector a flux difference vector;
    multiplying the flux difference vector by a proportionality factor, producing a voltage value;
    re-transforming the voltage value into the three-phase system;
    generating from the re-transformed voltage value an inverter firing pattern which impresses on the rotor a desired value of an electrical parameter which actively reduces a torque occurring during the transient change in the mains voltage.

2. The method of claim 1, wherein said electrical parameter is selected to actively reduce a rotor current occurring during the transient change in the mains voltage.

3. The method of claim 1, wherein the desired value of the electrical parameter is determined from suitable weighting of one or more parameters selected from the group consisting of stator flux vector, rotor flux vector, stator voltage vector, stator current vector, rotor current vector and rotor voltage vector.

4. The method of claim 1, wherein the desired value impressed on the rotor is substantially independent of types of mains faults that cause the transient mains voltage change.

5. The method of claim 1, wherein the electrical parameter is a rotor voltage.

6. The method of claim 5, wherein the rotor voltage has an associated rotor voltage vector, with a desired value of the rotor voltage vector being determined from at least one component of a difference vector derived from a voltage vector of rotor flux and a voltage vector of stator flux.

7. The method of claim 6, wherein the desired value of the rotor voltage vector is proportional to the difference vector derived from the rotor flux vector and the stator flux vector.

8. The method of claim 6, wherein the desired value of the rotor voltage does not exceed an predetermined value, further comprising the step of weighting the difference vector in favor of a component of the difference vector that is perpendicular to the stator flux vector.

9. The method of claim 6, wherein the desired value of the rotor voltage does not exceed an predetermined value, further comprising the step of weighting the difference vector in favor of a component of the difference vector that is parallel to the stator flux vector.

10. The method of claim 5, wherein the inverter has discrete switching states, further comprising the steps of:
sampling phase voltages of the inverter during a sampling period, and
switching only one of the discrete switching states of the inverter during the sampling period, wherein the one switching state is selected to have a phase position closest to a phase position of the desired value of the rotor voltage.

11. The method of claim 5, wherein a desired value of the rotor voltage is determined by suitable weighting of a transient rotor flux and a quasi-steady-state stator flux.

12. The method of claim 5, wherein a desired value of the rotor voltage is determined by suitable weighting of a transient rotor flux and a transient stator flux.

13. The method of claim 1, wherein the rotor flux and the stator flux are calculated from at least one measured parameter selected from the group consisting of stator voltage, stator current, rotor current and rotor voltage.

14. An apparatus for operating a double-fed asynchronous machine, comprising:
an inverter;
a stator connected to a mains;
a rotor connected to the inverter; and
a control unit connected to the rotor, the control unit comprising
means for detecting a transient change in a mains voltage,
means for obtaining or measuring a rotor parameter and a stator parameter;
means for transforming the obtained or measured rotor parameter and stator parameter from a three-phase system into a two-phase system, producing a stator flux vector and a rotor flux vector;
means for computing from the stator flux vector and the rotor flux vector a flux difference vector;
means for multiplying the flux difference vector by a proportionality factor, producing a voltage value;
means for re-transforming the voltage value into the three-phase system;
means for generating from the re-transformed voltage value an inverter firing pattern; and
means for impressing on the rotor in response to the detected transient change a desired value of an electrical parameter which actively reduces a torque occurring during the transient change in the mains voltage.

15. The apparatus of claim 14, wherein said electrical parameter is selected to actively reduce a rotor current occurring during the transient change in the mains voltage.

16. The apparatus of claim 14, wherein the desired value of the electrical parameter is determined from suitable weighting of one or more parameters selected from the group consisting of stator flux vector, rotor flux vector, stator voltage vector, stator current vector, rotor current vector and rotor voltage vector.

17. The apparatus of claim 14, wherein the desired value impressed on the rotor is substantially independent of types of mains faults that cause the transient mains voltage change.

18. The apparatus of claim 14, wherein the electrical parameter is a rotor voltage.

19. The apparatus of claim 18, wherein the rotor voltage has an associated rotor voltage vector, with a desired value of the rotor voltage vector being determined from at least one component of a difference vector derived from a voltage vector of rotor flux and a voltage vector of stator flux.

20. The apparatus of claim 19, wherein the desired value of the rotor voltage vector is proportional to the difference vector from the rotor flux vector and the stator flux vector.

21. The apparatus of claim 19, wherein the desired value of the rotor voltage does not exceed an predetermined value, further comprising the step of weighting the difference vector in favor of a component of the difference vector that is perpendicular to the stator flux vector.

22. The apparatus of claim 19, wherein the desired value of the rotor voltage does not exceed an predetermined value, further comprising the step of weighting the difference vector in favor of a component of the difference vector that is parallel to the stator flux vector.

23. The apparatus of claim 18, wherein the means of the control unit are configured to switch the inverter, wherein the means switch only one discrete switching state of the inverter during a sampling period, with the means selecting the switching state that has a phase position closest to a phase position of the desired value of the rotor voltage.

24. The apparatus of claim 18, wherein the means of the control unit are configured to determine the desired value of the rotor voltage by suitable weighting of a transient rotor flux and a quasi-steady-state stator flux.

25. The apparatus of claim 18, wherein the means of the control unit are configured to determine the desired value of the rotor voltage by suitable weighting of a transient rotor flux and a transient stator flux.

26. The apparatus of claim 14, wherein the rotor flux and the stator flux are calculated from at least one measured parameter selected from the group consisting of stator voltage, stator current, rotor current and rotor voltage.

27. The apparatus of claim 14, further comprising a controllable series impedance arranged in a mains feed supplying electric power to the stator and the inverter of the doubly-fed asynchronous machine.

28. The apparatus of claim 14, further comprising a controllable series impedance arranged in a mains feed of the stator of the doubly-fed asynchronous machine.

29. The apparatus of claim 14, further comprising a resistor circuit connected to a voltage intermediate circuit of the inverter for reducing an intermediate circuit voltage of the inverter.

* * * * *